US012664359B1

(12) United States Patent
Mehta et al.

(10) Patent No.: US 12,664,359 B1
(45) Date of Patent: Jun. 23, 2026

(54) CONVERSATION ORCHESTRATION SYSTEM WITH NATURAL LANGUAGE PROCESSING AND RESPONSE HANDLING

(71) Applicant: Wells Fargo Bank, N.A., San Francisco, CA (US)

(72) Inventors: Chintan Mehta, San Ramon, CA (US); Michelle Moore, Mooresville, NC (US); Ramakrishna Swarup Pogalur, San Ramon, CA (US); Kunal Jha, Indian Land, SC (US); Kapil Soni, Bangalore (IN); Venkatesan Chinnaraju, Fremont, CA (US); Upul D. Hanwella, San Francisco, CA (US); Ranganathan Kanchi, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 759 days.

(21) Appl. No.: 17/643,758

(22) Filed: Dec. 10, 2021

Related U.S. Application Data

(60) Provisional application No. 63/174,873, filed on Apr. 14, 2021.

(51) Int. Cl.
*G06F 40/20* (2020.01)
*G06F 16/3329* (2025.01)
(Continued)

(52) U.S. Cl.
CPC ........ *G06F 40/20* (2020.01); *G06F 16/90332* (2019.01); *H04L 65/1066* (2013.01)

(58) Field of Classification Search
CPC .... G06F 40/20; G06F 40/30; G06F 16/90332; G06F 16/3329; G10L 15/22
(Continued)

(56) References Cited

U.S. PATENT DOCUMENTS 7,437,660 B1 * 10/2008 Mehta .................. G06F 16/972
                                                    715/240
11,380,308 B1 * 7/2022 Pandey ................. G06N 20/00
(Continued)

OTHER PUBLICATIONS

U.S. Appl. No. 17/457,384, filed Dec. 2, 2021, naming inventors Mehta et al.

*Primary Examiner* — Richemond Dorvil
*Assistant Examiner* — Rodrigo A Chavez
(74) *Attorney, Agent, or Firm* — Shumaker & Sieffert, P.A.

(57) ABSTRACT

A computing system is described that includes a natural language processing (NLP) node configured to receive an input data stream during a communication session with a customer; select a primary NLP engine for the communication session from a plurality of NLP engines based on accuracy scores, use case requirements, and/or performance constraints; and route the input data stream to the primary NLP engine. The NLP node may select one or more of the other NLP engines to operate as secondary NLP engines in training stages or as standby NLP engines during the communication session. The output from the primary NLP engine may be used to generate responses to customer queries within the input data stream. At a communication session boundary, the NLP node may select the most appropriate one of the NLP engines to operate as the primary NLP for a subsequent communication session.

17 Claims, 4 Drawing Sheets

(51) Int. Cl.
  *G06F 16/9032* (2019.01)
  *G06F 40/30* (2020.01)
  *G10L 15/22* (2006.01)
  *H04L 65/1066* (2022.01)

(58) Field of Classification Search
  USPC .......................................... 704/9, 257, 275
  See application file for complete search history.

(56) References Cited

U.S. PATENT DOCUMENTS

| | | | |
|---|---|---|---|
| 2020/0342032 A1* | 10/2020 | Subramaniam | G06F 11/3466 |
| 2021/0304074 A1* | 9/2021 | Zaremoodi | G06N 3/09 |
| 2022/0035799 A1* | 2/2022 | Bhutada | G06F 40/30 |
| 2022/0210033 A1* | 6/2022 | Higgins | H04L 51/02 |
| 2022/0229991 A1* | 7/2022 | Duong | G06N 3/08 |
| 2022/0230000 A1* | 7/2022 | Jalaluddin | G06F 40/295 |
| 2022/0300325 A1* | 9/2022 | Tubman | G06F 9/5061 |

* cited by examiner

CONVERSATION ORCHESTRATION SYSTEM WITH NATURAL LANGUAGE PROCESSING AND RESPONSE HANDLING

This application claims the benefit of U.S. Provisional Patent Application No. 63/174,873, filed Apr. 14, 2021, the entire contents of which is incorporated herein by reference.

TECHNICAL FIELD

This disclosure relates to text processing, and more specifically, to natural language processing of text.

BACKGROUND

Organizations that provide customer-facing applications or services and collect or otherwise handle customer personal information may utilize computer models to enrich customer experiences. In some examples, the computer models may include artificial intelligence- or machine learning-based models that use statistical, economic, financial, or mathematical theories and techniques to solve problems related to fraud, risk, and the like. As one specific example, the computer models may comprise a natural language processing (NLP) model configured to process and analyze natural language data and its context to extract information and/or categorize the text file. The NLP model may be used in speech recognition or speech-to-text processing, natural language understanding, and/or natural language generation.

SUMMARY

This disclosure describes a virtual assistance platform computing system configured to orchestrate the processing and handling of customer queries and automated replies. More specifically, this disclosure describes techniques performed by a natural language processing (NLP) node within the virtual assistance platform that is configured to route an input data stream including one or more customer queries during a communication session with a customer to a primary NLP engine selected for the communication session from a plurality of NLP engines. In some examples, the NLP node may also select one or more of the other NLP engines to operate as secondary NLP engines in training stages and/or select a second NLP engine to operate as a standby NLP engine to provide redundancy while the primary NLP engine processes the input data stream during the communication session. The output from the primary NLP engine may then be used to generate a personalized response to at least one of the customer queries within the input data stream of the communication session.

The NLP node may use rules and/or algorithms to determine which NLP engine of the plurality of NLP engines should operate as the primary NLP engine for the communication session. For example, the NLP node may select the most appropriate one of the NLP engines to operate as the primary NLP for the communication session based on accuracy scores associated with the NLP engines, use case requirements of the communication session, and/or performance constraints of the computing system. At a communication session boundary (i.e., a change from a previous communication session to a subsequent communication session with the same or a different customer), the NLP node may determine updated accuracy scores for one or more of the plurality of NLP engines, and select the primary NLP engine for the subsequent communication session in a similar manner based at least on the updated accuracy scores. In some examples, each of the plurality of NLP engines may be located on-premises and/or on a cloud platform. Regardless of location, each of the multiple NLP engines may be accessible by the NLP node via application programming interfaces (APIs).

The output of the primary NLP for the communication session may comprise predicted intent of the one or more customer queries within the input data stream of the communication session, which the virtual assistance platform may use to classify the customer queries. A response node within the virtual assistance platform may then generate a response to at least one of the customer queries based on the classified intent of the customer query and personal information and/or account information of the customer. The response node may perform the response building on-premises with the help of a dialogue management platform. The dialogue management platform may be connected to various digital service platforms hosted on-premises and, therefore, knows what data to pull and where to pull the data from to build the personalized response for the customer.

The virtual assistance platform may be connected to a customer-facing chat service or other customer service communication portal. The virtual assistance platform may comprise one or more computing devices in a centralized or distributed architecture configured to run at least the NLP node and the response node to provide automated customer service replies 24/7 with high availability and high quality of responses to customer queries. In some examples, the virtual assistance platform may also support switching to a live agent to handle customer queries for a particular customer based on heuristics computed from historical and current interactions with the particular customer.

In one example, this disclosure is directed to a method comprising: receiving, by a computing system, an input data stream including one or more customer queries during a communication session with a customer, wherein the one or more customer queries originate from a customer-facing service; selecting, by the computing system, a first NLP engine from a plurality of NLP engines to operate as a primary NLP engine for the communication session based on one or more of accuracy scores for the plurality of NLP engines, use case requirements of the communication session, or performance constraints of the computing system; routing, by the computing system, the input data stream of the communication session to the primary NLP engine for the communication session, the primary NLP engine configured to process the one or more customer queries within the input data stream of the communication session; and generating, by the computing system, one or more responses to the one or more customer queries within the input data stream of the communication session based at least in part on output of the primary NLP engine for the communication session.

In another example, this disclosure is directed to a computing system comprising: a memory; and one or more processors in communication with the memory. The one or more processors are configured to: receive an input data stream including one or more customer queries during a communication session with a customer, wherein the one or more customer queries originate from a customer-facing service; select a first NLP engine from a plurality of NLP engines to operate as a primary NLP engine for the communication session based on one or more of accuracy scores for the plurality of NLP engines, use case requirements of the communication session, or performance constraints of the computing system; route the input data stream of the communication session to the primary NLP engine for the communication session, the primary NLP engine configured to process the one or more customer queries within the input data stream of the communication session; and generate one or more responses to the one or more customer queries within the input data stream of the communication session based at least in part on output of the primary NLP engine for the communication session.

In an additional example, this disclosure is directed to a computer-readable storage medium comprising instructions that, when executed, cause one or more processors of a computing system to: receive an input data stream including one or more customer queries during a communication session with a customer, wherein the one or more customer queries originate from a customer-facing service; select a first natural language processing (NLP) engine from a plurality of NLP engines to operate as a primary NLP engine for the communication session based on one or more of accuracy scores for the plurality of NLP engines, use case requirements of the communication session, or performance constraints of the computing system; route the input data stream of the communication session to the primary NLP engine for the communication session, the primary NLP engine configured to process the one or more customer queries within the input data stream of the communication session; and generate one or more responses to the one or more customer queries within the input data stream of the communication session based at least in part on output of the primary NLP engine for the communication session.

The details of one or more examples of the disclosure are set forth in the accompanying drawings and the description herein. Other features, objects, and advantages of the disclosure will be apparent from the description and drawings, and from the claims.

DETAILED DESCRIPTION

Figure 1:
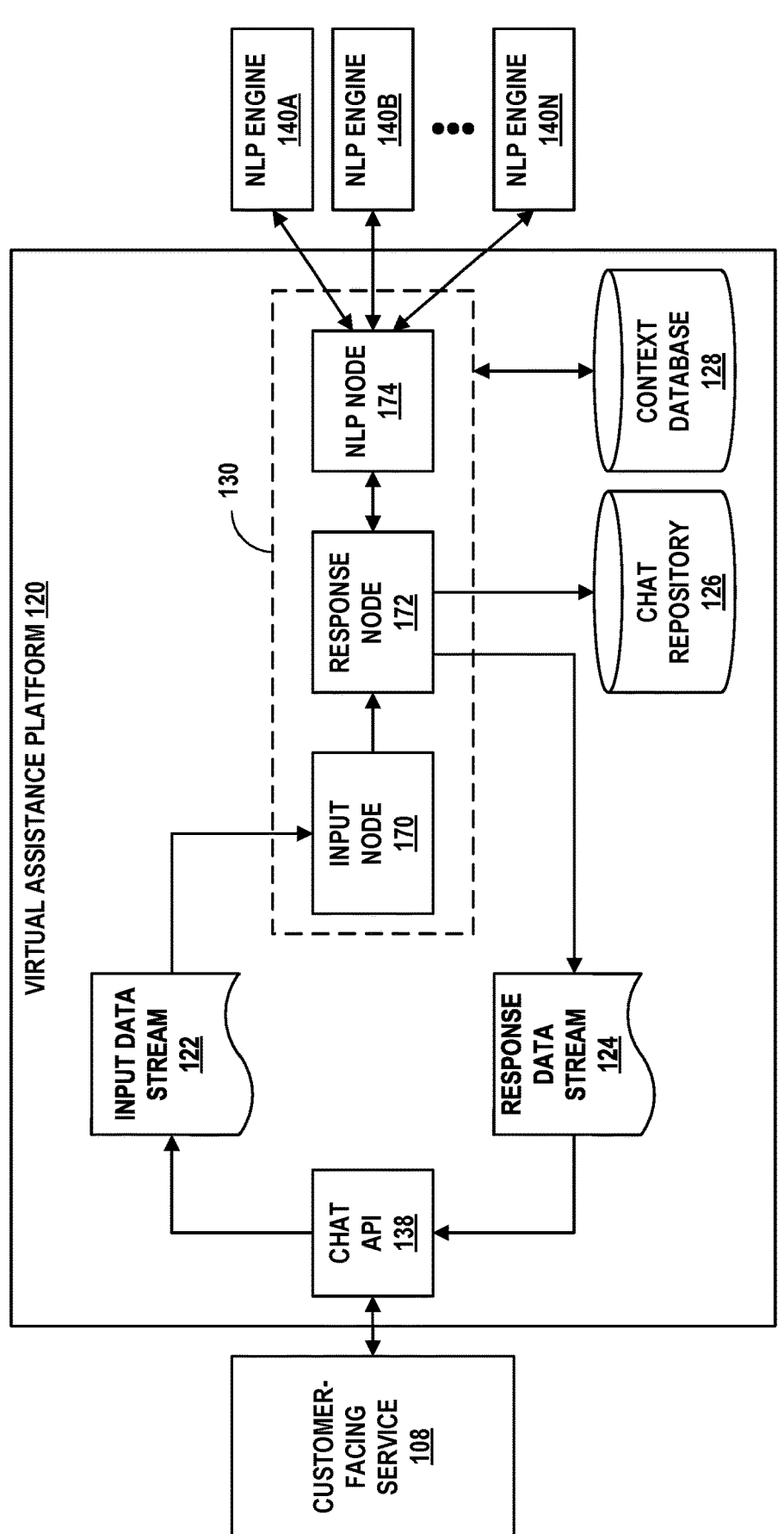
FIG. 1 is a block diagram illustrating an example virtual assistance platform including a natural language processing (NLP) node configured to route an input data stream of a communication session to a primary NLP engine for the communication session selected from a plurality of NLP engines, in accordance with one or more aspects of the present disclosure.

FIG. 1 is a block diagram illustrating an example virtual assistance platform 120 including a natural language processing (NLP) node 174 configured to route an input data stream 122 of a communication session to a primary NLP engine for the communication session selected from a plurality of NLP engines 140A-140N (collectively, "NLP engines 140"), in accordance with one or more aspects of the present disclosure. Virtual assistance platform 120 further includes a response node 172 configured to generate a personalized response to at least one customer query within the input data stream 122 based on the output of the primary NLP engine during the communication session.

As shown in the illustrated example of FIG. 1, an organization's customer-facing service 108, e.g., a chat bot, customer communication chat service or other customer service communication portal, may be connected to virtual assistance platform 120 hosted on one or more computing devices on-premises of the organization. The one or more computing devices may be organized in a centralized or distributed architecture. In the example of FIG. 1, virtual assistance platform 120 is also connected to multiple different NLP engines 140, which may be located on-premises and/or hosted on a cloud platform. Regardless of location, each of the multiple NLP engines 140 may be accessible by NLP node 174 via application programming interfaces (APIs).

In the example of FIG. 1, virtual assistance platform 120 includes a chat API 138, a chat repository 126, a context database 128, and a directed acyclic graph (DAG) 130 that includes nodes and links configured to process data streams to perform the functions of virtual assistance platform 120. DAG 130 may be run on or otherwise be supported by the one or more computing systems or devices of virtual assistance platform 120. In the illustrated example, DAG 130 includes an input node 170, response node 172, and NLP node 174. In other examples, DAG 130 may include additional nodes to perform additional functions of virtual assistance platform 120, including an audit node and/or masking node to protect customer personal information in customer communications. An example of a masking service used to obfuscate customer personal information in requests to off-premises, cloud-hosted applications is described in U.S. patent application Ser. No. 17/457,384, filed Dec. 2, 2021, the entire contents of which is incorporated herein by reference.

Customer-facing service 108 accesses virtual assistance platform 120 via chat API 138 to enable a customer to enter customer queries for inclusion in input data stream 122 during a communication session. The communication session may begin upon the customer logging into their account via customer-facing service 108 and virtual assistance platform 120, e.g., an online banking service or portal. The communication session may include all conversation or chat exchanges that occur while the customer is logged into their account. The communication session may end when the customer logs off or otherwise becomes disconnected from their account.

Input data steam 122 may comprise text data, voice data, or image data. Virtual assistance platform 120 is configured to process and accurately answer customer queries within input data stream 122 using DAG 130. More specifically, input node 170 receives input data stream 122 and passes input data stream 122 to response node 172, which further passes input data stream 122 to NLP node 174. In some examples, input node 170 may pre-process input data stream 122 received from customer-facing service 108 to prepare input data stream 122 for processing by response node 172, NLP node 174 and/or other nodes within DAG 130. In the case where input data stream 122 comprises voice data or image data, input node 170 may convert the voice data or image data into text data prior to passing input data stream 122 to response node 172 and/or NLP node 174. In other examples, the nodes of DAG 130 may process input data stream 122 in any of text, speech, or image formats.

In accordance with the disclosed techniques, NLP node 174 is configured to select one NLP engine, e.g., NLP engine 140A, of the multiple NLP engines 140 to operate as a primary NLP engine for the communication session, and route input data stream 122 of the communication session to the primary NLP for the communication session. The primary NLP engine may perform one or more of speech recognition processing or natural language understanding processing of the one or more customer queries within input data stream 122 of the communication session, and output a predicted intent for each of the customer queries within input data stream 122 of the communication session. The output from the primary NLP engine may then be used by response node 172 to generate a personalized response to at least one of the customer queries within input data stream 122 of the communication session.

In some examples, NLP node 174 may also select one or more of the other NLP engines 140, e.g., one or more of NLP engines 140B-140N, to operate as secondary NLP engines in training stages and/or select one of the other NLP engines 140, e.g., one or more of NLP engines 140B-140N, to operate as a standby NLP engine to provide redundancy while the primary NLP engine, e.g., NLP engine 140A, processes input data stream 122 during the communication session. Each of the secondary NLP engines may operate in a training stage or otherwise "learn" based on direct receipt of the customer queries within input data stream 122 of the communication session or based on the output of the primary NLP for the customer queries within input data stream 122 of the communication session. The standby NLP engine may be configured to take over processing of the customer queries within input data stream 122 in a case where the primary NLP engine fails during the communication session.

In some examples, one or more of NLP engines 140 may be pre-trained for particular use cases or domains associated with communication sessions, e.g., credit card customer queries or home lending customer queries, which may result in more accurate intent prediction for customer queries that fall within the particular use cases. In some examples, one or more of NLP engines 140 may use "lightweight" algorithms that comply with certain performance constraints of a computing system on which NLP node 174 is running in order to facilitate load balancing during high-load periods for the computing system.

NLP node 174 may use rules and/or algorithms to determine which NLP engine of the multiple NLP engines 140 should operate as the primary NLP engine for the communication session. For example, NLP node 174 may select the most appropriate one of NLP engines 140 to operate as the primary NLP for the communication session based on accuracy scores associated with NLP engines 140, use case requirements of the communication session, and/or performance constraints of the computing system supporting NLP node 174. At each communication session boundary (i.e., a change from a previous communication session to a subsequent communication session with the same or a different customer), NLP node 174 may determine updated accuracy scores for one or more of NLP engines 140, and select the primary NLP engine for the subsequent communication session in a similar manner as discussed above based at least on the updated accuracy scores. As part of the selection process for the subsequent communication session, NLP node 174 may analyze the updated accuracy scores to determine whether any of the secondary NLP engines have improved accuracy scores compared to the primary NLP engine for the previous communication session. In scenarios where one of the secondary NLP engines has a higher accuracy score than the primary NLP engine for the previous communication session, NLP node 174 may select that secondary NLP engine to operate as the primary NLP engine for the subsequent communication session, assuming the use case requirements and performance constrains are also met by the secondary NLP engine.

The output of the primary NLP engine may comprise predicted intent of the one or more customer queries within input data stream 122 of the communication session, which virtual assistance platform 120 may use to classify the customer queries. Response node 172 may then generate a response to at least one of the customer queries within input data stream 122 based on the classified intent of the customer query from NLP node 174 and personal information and/or account information of the customer, e.g., included within context database 128. Response node 172 may perform the response building on-premises of the organization with the help of a dialogue management platform (not shown in FIG. 1). The dialogue management platform may be connected to various digital service platforms hosted on-premises and, therefore, knows what data to pull and where to pull the data from to build the personalized response for the customer. Response node 172 may send response data stream 124 including one or more generated responses back to chat API 138, which then provides the responses to the customer via customer-facing service 108. Response node 172 may store customer queries of input data stream 122 and/or responses of response data stream 124 in chat repository 126.

Virtual assistance platform 120 is configured to run at least NLP node 174 and response node 172 to provide automated customer service replies 24/7 with high availability and high quality of responses to customer queries. In some examples, virtual assistance platform 120 may also support switching to a live agent to handle a query for a particular customer based on heuristics computed from historical and current interactions with the particular customer.

Figure 2:
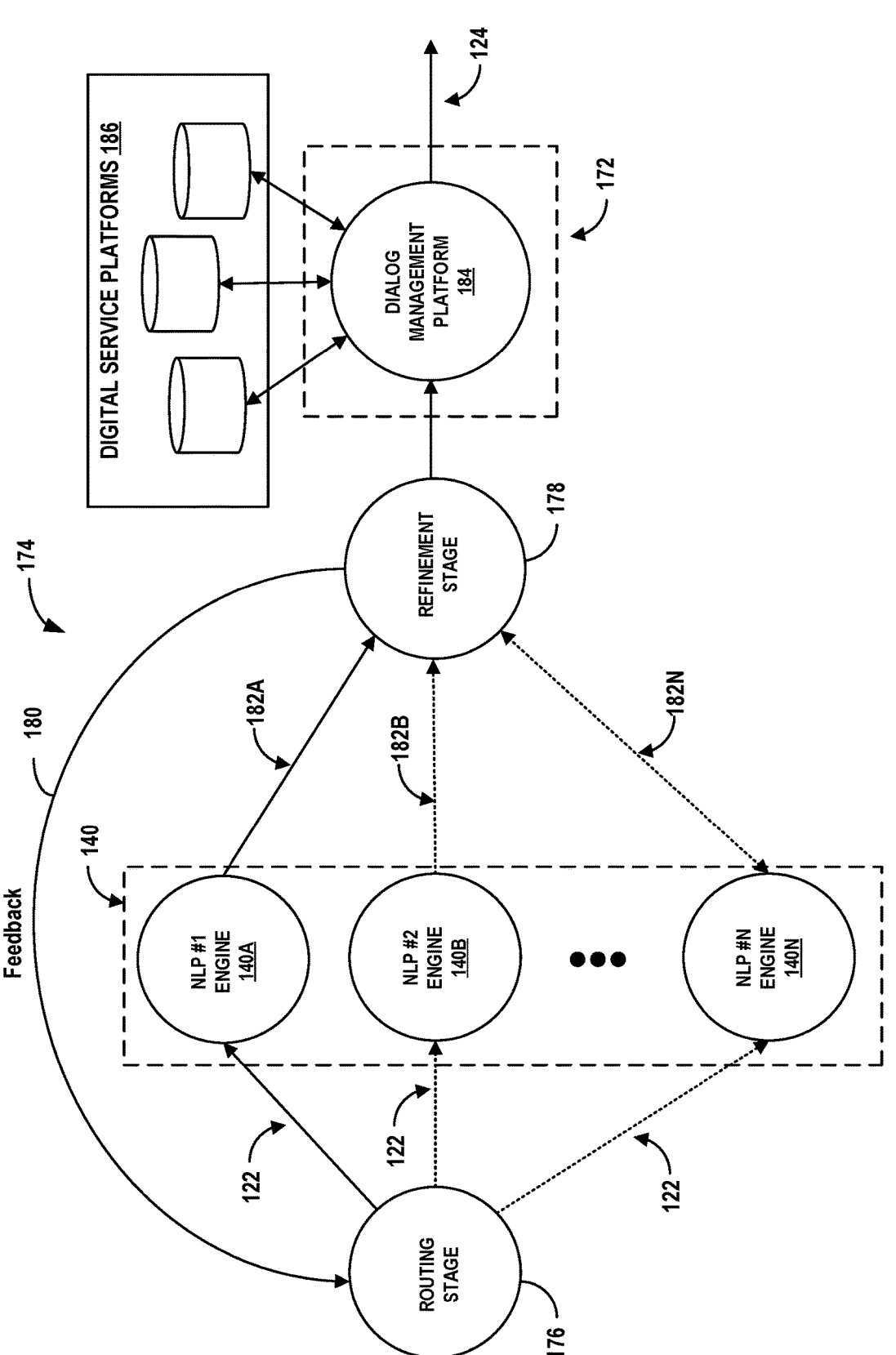
FIG. 2 is a conceptual diagram illustrating an example data flow through an NLP node and a response node of a virtual assistance platform, in accordance with one or more aspects of the present disclosure.

FIG. 2 is a conceptual diagram illustrating an example data flow through NLP node 174 and response node 172 of virtual assistance platform 120, in accordance with one or more aspects of the present disclosure. As illustrated in FIG. 2, during a routing stage 176, NLP node 174 selects one NLP engine (e.g., NLP #1 engine 140A) from a plurality of NLP engines 140 (i.e., NLP #1-#N engines 140A-140N) to operate as a primary NLP engine for a current communication session based on one or more of accuracy scores for NLP engines 140, use case requirements of the current communication session, or performance constraints of the computing system supporting NLP node 174. Routing stage 176 of NLP node 174 then routes input data stream 122 of the communication session to the primary NLP engine (NLP #1 engine 140A for the current communication session) and a refinement stage 178 of NLP node 174 receive an output 182A from the primary NLP engine (NLP #1 engine 140A) in response.

As further illustrated in FIG. 2, in some examples, routing stage 176 of NLP node 174 also selects a second NLP (e.g., NLP #2 engine 140B) from plurality of NLP engines 140 to operate as a standby NLP engine for the current communication session. As illustrated by dotted lines in FIG. 2, routing stage 176 may route input data stream 122 of the current communication session to the standby NLP engine (NLP #2 engine 140B) and, in some cases, refinement stage

178 receives an output or other information 182B from the standby NLP engine (NLP #2 engine 140B).

In addition, in some examples, routing stage 176 of NLP node 174 may select at least one of the other NLP engines 140 (i.e., those not selected as the primary or standby NLP engines for the current communication session) to operate as a secondary NLP engine (e.g., NLP #N engine 140N) that may operate in a training stage or otherwise perform learning during the current communication session. As illustrated by dotted lines in FIG. 2, in scenarios where the secondary NLP engine (NLP #N engine 140N) is trained based on the customer queries within input data stream 122 directly, routing stage 176 of NLP node 174 may route input data stream 122 of the current communication session to the secondary NLP engine (NLP #N engine 140N). In other scenarios, the secondary NLP engine (NLP #N engine 140N) may be trained based on the output 182A of the primary NLP engine (NLP #1 engine 140A) during the current communication session. Refinement stage 178 may receive validation or test output 182N from the secondary NLP engine (NLP #N engine 140N) for the training stage during the current communication session.

Although the example of FIG. 2 illustrates routing stage 176 of NLP node 174 optionally sending input data stream 122 to each of NLP engines 140, in other examples, routing stage 176 may not send input data stream 122 to certain types of secondary NLP engines that are trained only on the output of the primary NLP engine (e.g., NLP #1 engine 140A) during the current communication session. As another example, routing stage 176 may not send input data stream 122 to other NLP engines 140 that are pre-trained for particular use cases or domains (e.g., credit card customer queries or home lending customer queries) that are not associated with the current communication session. Routing stage 176 may also not send input data stream 122 to other NLP engines 140 that are pre-trained using lightweight algorithms that comply with certain performance or system-load constraints of the computing system supporting NLP node 174 that are not applicable during the current communication session.

In some examples, routing stage 176 of NLP node 174 may use a rule-based model to select the primary NLP engine based on the NLP #1 engine 140A having a highest accuracy score from among the accuracy scores for the plurality of NLP engines 140. In other examples, routing stage 176 of NLP node 174 may determine performance constraints of the computing system supporting NLP node 174 during the current communication session, and may access a database of parameters for each of the plurality of NLP engines 140 to determine algorithm size and processing time parameters for each of the NLP engines 140. Routing stage 176 may then use a rule-based model to identify a set of one or more NLP engines (including NLP #1 engine 140A) that use algorithms that comply with the performance constraints of the computing system during the current communication session and select the NLP #1 engine 140A as having a highest accuracy score from among the accuracy scores for the identified set of NLP engines. In a further example, routing stage 176 of NLP node 174 may determining use case requirements of the current communication session, and may access a database of parameters for each of the plurality of NLP engines 140 to determine use cases or domains for one or more of the pre-trained NLP engines 140. Routing stage 176 may then use a rule-based model to identify a set of one or more NLP engines (including NLP #1 engine 140A) that are pre-trained for the use case requirements of the current communication session and select the NLP #1 engine 140A as having a highest accuracy score from among the accuracy scores for the identified set of NLP engines. In some examples, routing stage 176 may use a rule-based model to identify at least one NLP engine, e.g., NLP #1 engine 140A, that complies with both the performance constraints and the use case requirements.

Upon receipt of input data stream 122, the primary NLP engine (NLP #1 engine 140A) performs one or more of speech recognition processing or natural language understanding processing. As described above, input data stream 122 may comprises text data, voice data, or image data. In some examples, where input data stream 122 comprises voice data or image data, NLP node 174 or another functional node within virtual assistance platform 120 (e.g., input node 170 from FIG. 1) may convert the voice data or image data into text data prior to routing input data stream 122 to the primary NLP engine. In other examples, input data stream 122 may be routed to the primary NLP engine in any format and the primary NLP engine may perform any necessary conversions to text data.

The output or response 182A of the primary NLP engine (NLP #1 engine 140A) for input data stream 122 of the current communication session may comprise a predicted intent of one or more customer queries within the input data stream 122. In some examples, the output or response 182A of the primary NLP engine (NLP #1 engine 140A) may also include an accuracy score, or information from which refinement stage 178 of NLP node 174 may determine an accuracy score, associated with the primary NLP engine. In other examples, refinement stage 178 of NLP node 174 may request or pull current accuracy scores, or the information from which refinement stage 178 of NLP node 174 may determine accuracy scores, for one or more of NLP engines 140 via the corresponding APIs.

During refinement stage 178, NLP node 174 receives a continuous stream of output 182A from the primary NLP engine (NLP #1 engine 140A) for the current communication session with the customer. The nodes within DAG 130 of virtual assistance platform 120 from FIG. 1 (including NLP node 174) may process input data streams for multiple different communication sessions with multiple different customers that are logged into their accounts via customer-facing service 108 and virtual assistance platform 120. According to the disclosed techniques, NLP node 174 selects a primary NLP engine from the plurality of NLP engines 140 for each communication session, and potentially switches to use a different NLP engine as the primary NLP engine at each communication session boundary.

For example, refinement stage 178 of NLP node 174 analyzes and/or determines accuracy scores or other scores associated with NLP engines 140 at each communication session boundary to order to determine which NLP engines have improved accuracy scores based on training or learning that occurred during the previous communication session(s). More specifically, refinement stage 178 may receive an updated accuracy score from the primary NLP engine (NLP #1 engine 140A) for the current communication session, and receive an updated accuracy score from at least one secondary NLP engine (NLP #N engine 140N) operating in a training stage during the current communication session. In other examples, refinement stage 178 may determine an updated accuracy score for the primary NLP engine (NLP #1 engine 140A) for the current communication session based on the output 182A of the primary NLP engine (NLP #1 engine 140A) during the current communication session, and determine an updated accuracy score for at least one secondary NLP engine (NLP #N engine 140N) operating in a training stage during the current communication session based on the validation or test output 182N of the secondary NLP engine (NLP #N engine 140N) for the training stage during the current communication session.

Refinement stage 178 may send feedback 180 to routing stage 176 of NLP node 174 to provide routing stage 176 with updated accuracy scores for NLP engines 140. In this way, at each communication session boundary (i.e., when changing from the current communication session to a subsequent communication session), routing node 176 of NLP node 174 may also use rules and/or algorithms to select the most appropriate one of the NLP engines 140 to operate as the primary NLP for the subsequent communication session based on the updated accuracy scores associated with the NLP engines 140, use case requirements of the subsequent communication session, and/or performance constraints of the computing system supporting NLP node 174.

NLP node 174 sends the output 182A of the primary NLP engine (NLP #1 engine 140A) for the current communication session to response node 172, which may include or be in communication with a dialog management platform 184. The output 182A may comprise predicted intents of customer queries within input data stream 122 of the current communication session that may be used to classify the customer queries. Response node 172 may use various digital service platforms 186 connected to dialog management platform 184 and the classified intents of the customer queries within input data stream 122 of the communication session to generate accurate and personalized responses to the customer queries. Response node 172 may then send the responses in a response data stream 124 to the customer via customer-facing service 108.

The techniques described herein may provide certain technical advantages. For example, the described techniques provide a scalable architecture with multiple NLP engines 140. NLP node 174 performs rule-based routing to select a primary NLP engine for a communication session from among a plurality of NLP engines 140 based on tradeoffs between use case of the communication session, system performance constraints, and NLP engine accuracy. Virtual assistance platform 120 provides flexibility to host the NLP engines 140 on-premises as well as on the cloud. Dialog management platform 184 of response node 172 ensures isolation of sensitive data while building the responses. Virtual assistance platform 120 and/or NLP node 174 may also support switching or routing to a live agent to handle queries within input data stream 122 for a particular customer based on heuristics computed from historical and current interactions with the particular customer. Virtual assistance platform 120 and/or NLP node 174 may further support multi-modal customer queries or communications, including text, voice, and image data.

Figure 3:
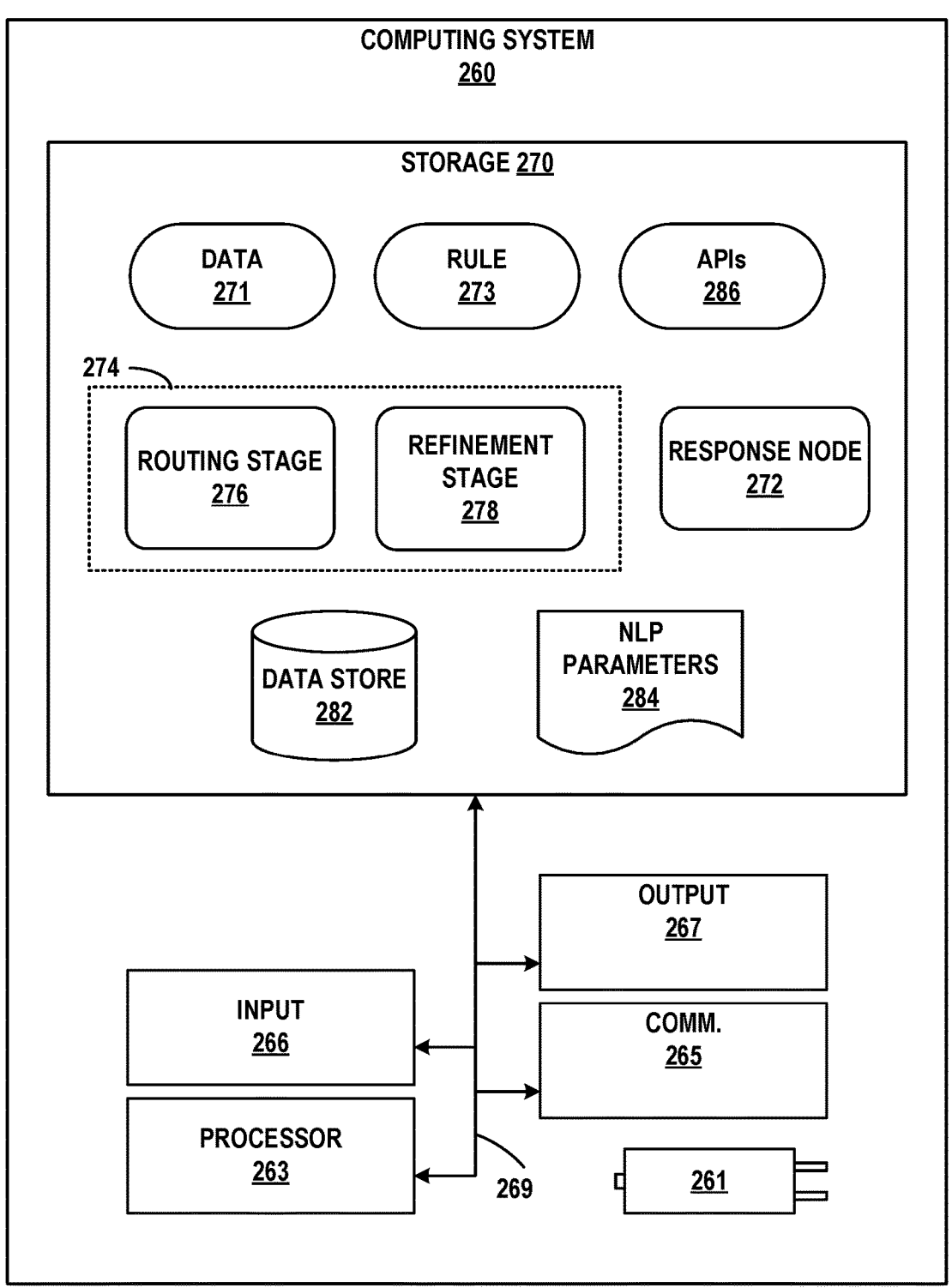
FIG. 3 is a block diagram illustrating an example computing system that supports an NLP node configured to route an input data stream of a communication session to a primary NLP engine for the communication session selected from a plurality of NLP engines, in accordance with one or more aspects of the present disclosure.

FIG. 3 is a block diagram illustrating an example computing system 260 that supports an NLP node 274 configured to route an input data stream of a communication session to a primary NLP engine for the communication session selected from a plurality of NLP engines, in accordance with one or more aspects of the present disclosure. One or more aspects of FIG. 3 may correspond to systems or components described herein within the context of FIG. 1 and/or FIG. 2. For example, computing system 260 may support at least a portion of virtual assistance platform 120 of FIG. 1, and NLP node 274 may correspond to NLP node 174 of FIGS. 1 and 2.

In the example of FIG. 3, computing system 260 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 260 represents a cloud computing system, server farm, and/or server cluster (or portion thereof) that provides services to client devices and other devices or systems. In other examples, computing system 260 may represent or be implemented through one or more virtualized compute instances (e.g., virtual machines, containers) of a data center, cloud computing system, server farm, and/or server cluster.

Although illustrated as a single system in FIG. 3, computing system 260 may represent multiple computing systems, and may be implemented in a distributed fashion across multiple data centers and/or geographic regions. Computing system 260 may be implemented by physical or virtualized computing devices, and may use or implement representational state transfer (REST)-based APIs for one or more services described herein.

Computing system 260 may include power source 261, one or more processors 263, one or more communication units 265, one or more input devices 266, one or more output devices 267, and one or more storage devices 270. Storage devices 270 may include data module 271, rule module 273, as well as response node 272, NLP node 274 with routing stage 276 and refinement stage 278, and APIs 286. Storage devices 270 may further include data store 282 and NLP parameters 284. One or more of the devices, modules, storage areas, or other components of computing system 260 may be interconnected to enable inter-component communications (physically, communicatively, and/or operatively). In some examples, such connectivity may be provided by through communication channels (e.g., communication channels 269), a system bus, a network connection, an inter-process communication data structure, or any other method for communicating data.

Power source 261 may provide power to one or more components of computing system 260. Power source 261 may receive power from the primary alternating current (AC) power supply in a building, home, or other location. In other examples, power source 261 may be a battery or a device that supplies direct current (DC). In still further examples, computing system 260 and/or power source 261 may receive power from another source. One or more of the devices or components illustrated within computing system 260 may be connected to power source 261, and/or may receive power from power source 261. Power source 261 may have intelligent power management or consumption capabilities, and such features may be controlled, accessed, or adjusted by one or more modules of computing system 260 and/or by one or more processors 263 to intelligently consume, allocate, supply, or otherwise manage power.

One or more processors 263 of computing system 260 may implement functionality and/or execute instructions associated with computing system 260 or associated with one or more modules illustrated herein and/or described below. One or more processors 263 may be, may be part of, and/or may include processing circuitry that performs operations in accordance with one or more aspects of the present disclosure. Examples of processors 263 include microprocessors, application processors, display controllers, auxiliary processors, one or more sensor hubs, and any other hardware configured to function as a processor, a processing unit, or a processing device. Computing system 260 may use one or more processors 263 to perform operations in accordance with one or more aspects of the present disclosure using software, hardware, firmware, or a mixture of hardware, software, and firmware residing in and/or executing at computing system 260.

One or more communication units 265 of computing system 260 may communicate with devices external to computing system 260 by transmitting and/or receiving data, and may operate, in some respects, as both an input device and an output device. In some examples, communication unit 265 may communicate with other devices over a network. In other examples, communication units 265 may send and/or receive radio signals on a radio network such as a cellular radio network. In other examples, communication units 265 of computing system 260 may transmit and/or receive satellite signals on a satellite network such as a Global Positioning System (GPS) network. Examples of communication units 265 include a network interface card (e.g., such as an Ethernet card), an optical transceiver, a radio frequency transceiver, a GPS receiver, or any other type of device that can send and/or receive information. Other examples of communication units 265 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 266 may represent any input devices of computing system 260 not otherwise separately described herein. One or more input devices 266 may generate, receive, and/or process input from any type of device capable of detecting input from a human or machine. For example, one or more input devices 266 may generate, receive, and/or process input in the form of electrical, physical, audio, image, and/or visual input (e.g., peripheral device, keyboard, microphone, camera). For computing devices that may be used by a user, one or more input devices 266 may generate or receive input from a keyboard, pointing device, voice responsive system, video camera, button, sensor, mobile input device, control pad, microphone, presence-sensitive screen, network, or any other type of device for detecting input from a human or machine.

One or more output devices 267 may represent any output devices of computing system 260 not otherwise separately described herein. One or more output devices 267 may generate, receive, and/or process input from any type of device capable of detecting input from a human or machine. For example, one or more output devices 267 may generate, receive, and/or process output in the form of electrical and/or physical output (e.g., peripheral device, actuator). For computing devices that may be used by a user, one or more output devices 267 may generate, present, and/or process output in the form of tactile, audio, visual, video, and other output. Some devices may serve as both input and output devices. For example, a communication device may both send and receive data to and from other systems or devices over a network.

One or more storage devices 270 within computing system 260 may store information for processing during operation of computing system 260. Storage devices 270 may store program instructions and/or data associated with one or more of the modules described in accordance with one or more aspects of this disclosure, e.g., response node 272 and NLP node 274. One or more processors 263 and one or more storage devices 270 may provide an operating environment or platform for such modules, which may be implemented as software, but may in some examples include any combination of hardware, firmware, and software. One or more processors 263 may execute instructions and one or more storage devices 270 may store instructions and/or data of one or more modules. The combination of processors 263 and storage devices 270 may retrieve, store, and/or execute the instructions and/or data of one or more applications, modules, or software. Processors 263 and/or storage devices 270 may also be operably coupled to one or more other software and/or hardware components, including, but not limited to, one or more of the components of computing system 260 and/or one or more devices or systems illustrated as being connected to computing system 260.

In some examples, one or more storage devices 270 are temporary memories, meaning that a primary purpose of the one or more storage devices is not long-term storage. Storage devices 270 of computing system 260 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 270, in some examples, also include one or more computer-readable storage media. Storage devices Storage devices 270 may further be configured for long-term storage of information as non-volatile memory space and retain information after activate/off cycles. Examples of non-volatile memories include magnetic and/or spinning platter hard disks, optical discs, Flash memories, or forms of electrically programmable memories (EPROM) or electrically erasable and programmable (EEPROM) memories.

Data module 271 may perform functions relating to receiving data to process for NLP engine routing, receiving data to process for NLP engine response handling, or receiving data used for generating rules or training algorithms used for routing and response handling. In some examples, data module 271 may receive an input data stream and prepare such information for processing by one or more other modules included within computing system 260, e.g., NLP node 274 in routing stage 276. In some examples, data module 271 may receive the input data stream as voice data or image data, and translate the data into text data (e.g., as a text transcript of an audio or video recording). Data module 271 may receive analysis data output from a primary NLP engine, and prepare the data for processing by one or more other modules included within computing system 260, e.g., NLP node 274 in refinement stage 278. Data module 271 may process data in preparation for use in generating rules or training and evaluating algorithms, and may store such data within data store 282. In some examples, data module 271 may store data related to each of the multiple NLP engines, such as use cases or domains, algorithm size, and processing time parameters. In other examples, such data may be split into NLP parameters 284.

Rules-based parsing module 273 may perform functions relating to applying rule-based algorithms or models for determining where to route an input data stream, and may be implemented as part of routing stage 276 of NLP node 274. In some examples, rules-based parsing module 273 may be used for identifying a set of NLP engines that fulfill current system-level performance constraints and/or communication session use case requirements, and then selecting a primary NLP engine within that set that has a highest accuracy score based at least on NLP parameters 284. In further examples, rules-based parsing module 273 may be used for selecting a second NLP engine to operate as a standby NLP engine for the primary NLP engine during the communication session. In other examples, rules-based parsing model 273 may be used for selecting one or more secondary NLP engines to operate in training stages based on the input data stream directly and/or the output from the primary NLP engine during the communication session.

Rules-based parsing module 273 may further perform functions relating to applying rule-based algorithms or models for determining which NLP engines have increased accuracy scores or other scores during a previous communication session, and may be implemented as part of refinement stage 278 of NLP node 274. In some examples, rules-based parsing module 273 may be used for identifying which of the NLP engines have increased accuracy scores or other scores during the previous communication session, and storing the identified increases in NLP parameters 284 for use in selecting a primary NLP engine for a subsequent communication session. In further examples, rules-based parsing module 273 may be used for computing or otherwise determining updated accuracy scores for at least the secondary NLP engines operating in training stage during the previous communication session, e.g., based on validation or test output from the secondary NLP engines. APIs 286 may provide one or more external devices or systems, such as one or more of NLP engines within the plurality of NLP engines, to access or interact with one or more other modules included within computing system 260, e.g., NLP node 274.

Although primarily described herein as using rule-based models or algorithms, in other examples NLP node 174 may instead use machine learning-based models to perform the functions of routing stage 276 and/or refinement stage 278. In those examples, a machine learning module may perform functions relating to training and/or evaluating machine learning-based models and applying the one or more models to generate predicted labels associated with elements in an input data stream. A machine learning module may further receive information for use in tuning one or more machine learning models, and may store such information. A machine learning module may use training data to generate a plurality of models, may use validation data to verify and adjust the skill of each of the models, and may use test data to confirm the skill of each of the models. Such training data, validation data, and/or test data may be stored in data store 282.

Response node 272 may include or access one or more rule-based or machine learning-based models to generate a response to at least one of the customer queries within the input data stream of the communication session with a customer based on the output from the primary NLP engine during the communication session. Response node 272 may access personal information and/or account information of the customer, e.g., from data store 282 or from context database 128 from FIG. 1. Response node 272 may then use the rule-based or machine learning-based models to generate personalized responses for the customer based on the output of the primary NLP engine for the communication session and the personal information and/or account information of the customer.

Units, nodes, and modules illustrated in FIGS. 3 and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 4:
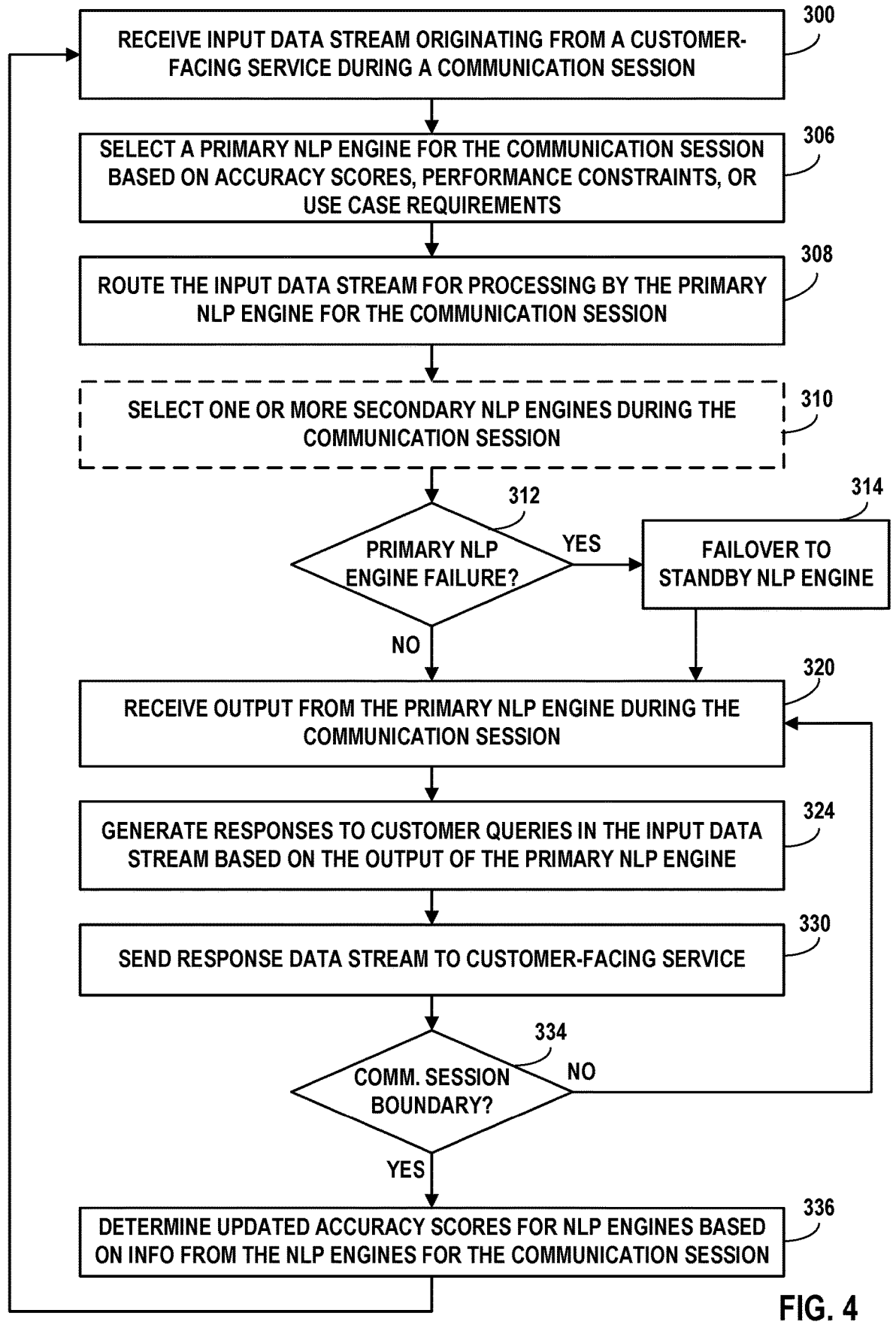
FIG. 4 is a flow chart illustrating an example of selecting a primary NLP engine for a communication session and generating responses to customer queries during the communication session based on output of the primary NLP engine, in accordance with one or more aspects of the present disclosure.

FIG. 4 is a flow chart illustrating an example of selecting a primary NLP engine for a communication session and generating responses to customer queries during the communication session based on output of the primary NLP engine, in accordance with one or more aspects of the present disclosure. The example operation of FIG. 4 is described herein with respect to response node 272 and NLP node 274 supported by computing system 260 of FIG. 3. In other examples, the operation of FIG. 4 may be performed by other computing systems configured to support one or more portions of a virtual assistance platform, such as response node 172 and NLP node 174 of virtual assistance platform 120 from FIGS. 1 and 2.

As seen in the example of FIG. 4, computing system 260 initially may receive an input data stream including one or more customer queries originating from a customer-facing service during a communication session with a customer, e.g., input data stream 122 originating from customer-facing service 108 of FIG. 1 (300). Next, NLP node 274 of computing system 260 may select a first NLP engine from a plurality of NLP engines to operate as a primary NLP engine for the communication session based on one or more of accuracy scores for the plurality of NLP engines, use case requirements of the communication session, or performance constraints of the computing system (306). In some examples, NLP node 274 may select the primary NLP engine as the NLP engine having a highest accuracy score from among the plurality of NLP engines. As one example, NLP node 274 may determine performance constraints of computing system 260 during the communication session, identify which NLP engines use algorithms that comply with the performance constrains based on NLP parameters 284, which stores parameters for the plurality of NLP engines, and select the primary NLP engine as the NLP engine having a highest accuracy score from among the identified NLP engines. As another example, NLP node 274 may determine use case requirements of the communication session, identify which NLP engines are pre-trained for the use case requirements based on NLP parameters 284, and select the primary NLP engine as the NLP engine having a highest accuracy score from among the identified NLP engines. NLP node 274 may then route the input data stream of the communication session to the primary NLP engine for the communication session, where the primary NLP engine is configured to process the customer queries within the input data stream of the communication session (308).

In some examples, NLP node 274 may select one or more NLP engines from the plurality of NLP engines to operate as secondary NLP engines during the communication session (310). Each of the secondary NLP engines may be configured to operate in a training stage based on at least one of the customer queries within the input data stream of the communication session or the output of the primary NLP engine for the customer queries within the input data stream of the communication session. In this way, the secondary NLP engines may be further trained to improve their corresponding accuracy scores during the communication session while the primary NLP engine processes the input streaming data of the communication session.

NLP node 274 may also select a second NLP engine from the plurality of NLP engines to operate as a standby NLP engine for the communication session, and may route the input data stream of the communication session to the standby NLP engine for the communication session. In the case where the primary NLP engine experiences a failure during the communication session (YES branch of 312), computing system 260 may failover to the standby NLP engine (314). The standby NLP engine then operates as the primary NLP engine for the communication session. In this way, the standby NLP engine provides redundancy or high availability in case of a failure of the primary NLP engine during the communication session. In either case (e.g., where the primary NLP engine does not experience a failure during the communication session (NO branch of 312) or where the standby NLP engine takes over as the primary NLP engine for the communication session (314)), NLP node 274 of computing system 260 continuously receives output from the primary NLP engine during the communication session (320).

Response node 272 of computing system 260 may generate one or more responses to the one or more customer queries within the input data stream of the communication session based at least in part on the output of the primary NLP engine for the communication session (324). Response node 272 may access personal information and/or account information of the customer, and generate a personalized response for the customer based on the output of the primary NLP engine for the communication session and the personal information and/or account information of the customer. Computing system 260 may then send a response data stream including the one or more responses, e.g., response data stream 124 of FIG. 1, to the customer-facing service (330). During the communication session (NO branch of 334), computing system 260 may continue to receive the output from the primary NLP engine (320), generate responses to the customer queries within the input data stream of the communication session (324), and send the responses to the customer-facing service (330).

At a communication session boundary between an end of the current communication session and a start of a subsequent communication session (YES branch of 334), NLP node 274 of computing system 260 may determine updated accuracy scores for one or more NLP engines of the plurality of NLP engines based on information received from the NLP engines for the current communication session (336). Computing system 260 may begin receiving an input data stream during the subsequent communication session with the same customer or a different customer (300), and NLP node 274 may select a primary NLP engine for the subsequent communication session based at least in part on the updated accuracy scores for the NLP engines, route the input data stream to the primary NLP engine for the subsequent communication session, and receive output form the primary NLP engine during the subsequent communication session (306, 308, 310, 312, 314, 320), and response node 272 may generate responses to customer queries within the input data stream of the subsequent communication session based on the output of the primary NLP engine and send the responses to the customer during the subsequent communication session (324, 330).

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of devices (e.g., computing system 260, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:

receiving, by a computing system, an input data stream including one or more customer queries during a communication session with a customer, wherein the one or more customer queries originate from a customer-facing service and are associated with a first query domain;

identifying, by a rule-based model and from a database of parameters for a plurality of natural language processing (NLP) engines, a set of NLP engines pre-trained for the first query domain associated with the communication session;

selecting, by the computing system, a first NLP engine from the set of NLP engines to operate as a primary NLP engine for the communication session based at least on accuracy scores for the set of NLP engines;

selecting, by the computing system, a second NLP engine from the set of NLP engines to operate as a standby NLP engine for the communication session based at least on the accuracy scores for the set of NLP engines;

routing, by the computing system, the input data stream of the communication session to the primary NLP engine for the communication session, the primary NLP engine configured to process the one or more customer queries within the input data stream of the communication session;

based on a failure of the primary NLP engine such that the primary NLP engine is unable to process the one or more customer queries, automatically routing the input data stream of the communication session to the standby NLP engine for the communication session, the standby NLP engine configured to process the one or more customer queries within the input data stream of the communication session; and generating, by the computing system, one or more responses to the one or more customer queries within the input data stream of the communication session based at least in part on output of one of the primary NLP engine or the standby NLP engine for the communication session.

2. The method of claim 1, further comprising selecting one or more NLP engines from the plurality of NLP engines to operate as secondary NLP engines during the communication session, wherein each of the secondary NLP engines is configured to operate in a training stage based on the one or more customer queries within the input data stream of the communication session or the output of the primary NLP engine for the one or more customer queries within the input data stream of the communication session.

3. The method of claim 1, wherein selecting the first NLP engine to operate as the primary NLP engine for the communication session comprises selecting, by a second rule-based model, the first NLP engine as having a highest accuracy score from among the accuracy scores for the set of NLP engines.

4. The method of claim 1, wherein selecting the first NLP engine to operate as the primary NLP engine for the communication session comprises:

determining performance constraints of the computing system during the communication session;

identifying, by a second rule-based model and from the database of parameters for the plurality of NLP engines, one or more NLP engines from the set of NLP engines that use algorithms that comply with the performance constraints of the computing system, the one or more NLP engines including the first NLP engine; and selecting, by the rule-based model, the first NLP engine as having a highest accuracy score from among the accuracy scores for the identified one or more NLP engines.

5. The method of claim 1, wherein the input data stream of the communication session comprises a first input data stream of a first communication session, the method further comprising:

receiving, by the computing system, a second input data stream including one or more second customer queries during a second communication session, wherein the one or more second customer queries are associated with a second query domain;

identifying, by the rule-based model and from the database of parameters for the plurality of NLP engines, a second set of NLP engines pre-trained for the second query domain associated with the second communication session;

selecting, by the computing system, a third NLP engine from the second set of NLP engines to operate as a primary NLP engine for the second communication session based at least on accuracy scores for the second set of NLP engines;

routing, by the computing system, the second input data stream of the second communication session to the primary NLP engine for the second communication session; and generating, by the computing system, one or more responses to the one or more second customer queries within the second input data stream of the second communication session based at least in part on output of the primary NLP engine for the second communication session.

6. The method of claim 5, wherein selecting the third NLP engine comprises, at a communication session boundary between an end of the first communication session and a start of the second communication session:

determining updated accuracy scores for one or more NLP engines of the plurality of NLP engines based on information received from the one or more NLP engines for the first communication session; and selecting, by the computing system, the third NLP engine from the second set of NLP engines to operate as the primary NLP engine for the second communication session based at least in part on the updated accuracy scores for the one or more NLP engines of the plurality of NLP engines.

7. The method of claim 6, wherein determining the updated accuracy scores comprises:

receiving an updated accuracy score from the first NLP engine operating as the primary NLP engine for the first communication session; and receiving an updated accuracy score from at least one NLP engine operating as a secondary NLP engine in a training stage during the first communication session.

8. The method of claim 6, wherein determining the updated accuracy scores comprises:

determining an updated accuracy score for the first NLP engine operating as the primary NLP engine for the first communication session based on the output of the primary NLP engine during the first communication session; and determining an updated accuracy score for at least one NLP engine operating as a secondary NLP engine in a training stage during the first communication session based on validation or test output of the secondary NLP engine for the training stage during the first communication session.

9. The method of claim 1, wherein generating the one or more responses to the one or more customer queries within the input data stream of the communication session comprises:

determining one or more of personal information or account information of the customer; and generating at least one personalized response for the customer based on the output of the primary NLP engine for the communication session and the one or more of personal information or account information of the customer.

10. The method of claim 1, further comprising sending, by the computing system, a response data stream including the one or more responses to the customer-facing service.

11. A computing system comprising:

a memory; and one or more processors in communication with the memory, the one or more processors configured to:

receive an input data stream including one or more customer queries during a communication session with a customer, wherein the one or more customer queries originate from a customer-facing service and are associated with a first query domain;

identify, by a rule-based model and from a database of parameters for a plurality of natural language processing (NLP) engines, a set of NLP engines pre-trained for the first query domain associated with the communication session;

select a first NLP engine from the set of NLP engines to operate as a primary NLP engine for the communication session based at least on accuracy scores for the set of NLP engines;

select a second NLP engine from the set of NLP engines to operate as a standby NLP engine for the communication session based at least on the accuracy scores for the set of NLP engines;

route the input data stream of the communication session to the primary NLP engine for the communication session, the primary NLP engine configured to process the one or more customer queries within the input data stream of the communication session;

based on a failure of the primary NLP engine such that the primary NLP engine is unable to process the one or more customer queries, automatically route the input data stream of the communication session to the standby NLP engine for the communication session, the standby NLP engine configured to process the one or more customer queries within the input data stream of the communication session; and generate one or more responses to the one or more customer queries within the input data stream of the communication session based at least in part on output of one of the primary NLP engine or the standby NLP engine for the communication session.

12. The computing system of claim 11, wherein the one or more processors are further configured to select one or more NLP engines from the plurality of NLP engines to operate as secondary NLP engines during the communication session, wherein each of the secondary NLP engines is configured to operate in a training stage based on the one or more customer queries within the input data stream of the communication session or the output of the primary NLP engine for the one or more customer queries within the input data stream of the communication session.

13. The computing system of claim 11, wherein to select the first NLP engine to operate as the primary NLP engine for the communication session, the one or more processors are configured to select, by a second rule-based model, the first NLP engine as having a highest accuracy score from among the accuracy scores for the set of NLP engines.

14. The computing system of claim 11, wherein to select the first NLP engine to operate as the primary NLP engine for the communication session, the one or more processors are further configured to:

determine performance constraints of the computing system during the communication session;

identify, by a second rule-based model and from the database of parameters for the plurality of NLP engines, one or more NLP engines from the set of NLP engines that use algorithms that comply with the performance constraints of the computing system, the one or more NLP engines including the first NLP engine; and select, by the rule-based model, the first NLP engine as having a highest accuracy score from among the accuracy scores for the identified one or more NLP engines.

15. The computing system of claim 11, wherein the input data stream of the communication session comprises a first input data stream of a first communication session, and wherein the one or more processors are configured to:

receiving, by the computing system, a second input data stream including one or more second customer queries during a second communication session, wherein the one or more second customer queries are associated with a second query domain;

identifying, by the rule-based model and from the database of parameters for the plurality of NLP engines, a second set of NLP engines pre-trained for the second query domain associated with the second communication session;

selecting, by the computing system, a third NLP engine from the second set of NLP engines to operate as a primary NLP engine for the second communication session based at least on accuracy scores for the second set of NLP engines;

routing, by the computing system, the second input data stream of the second communication session to the primary NLP engine for the second communication session; and generating, by the computing system, one or more responses to the one or more second customer queries within the second input data stream of the second communication session based at least in part on output of the primary NLP engine for the second communication session.

16. The computing system of claim 15, wherein to select the third NLP engine, the one or more processors are configured to, at a communication session boundary between an end of the first communication session and a start of the second communication session:

determine updated accuracy scores for one or more NLP engines of the plurality of NLP engines based on information received from the one or more NLP engines for the first communication session; and select the third NLP engine from the second set of NLP engines to operate as the primary NLP engine for the second communication session based at least in part on the updated accuracy scores for the one or more NLP engines of the plurality of NLP engines.

17. A computer-readable storage medium comprising instructions that, when executed, cause one or more processors of a computing system to:

receive an input data stream including one or more customer queries during a communication session with a customer, wherein the one or more customer queries originate from a customer-facing service and are associated with a first query domain;

identify, by a rule-based model and from a database of parameters for a plurality of natural language processing (NLP) engines, a set of NLP engines pre-trained for the first query domain associated with the communication session;

select a first NLP engine from the set of NLP engines to operate as a primary NLP engine for the communication session based at least on accuracy scores for the set of NLP engines;

select a second NLP engine from the set of NLP engines to operate as a standby NLP engine for the communication session based at least on the accuracy scores for the set of NLP engines;

route the input data stream of the communication session to the primary NLP engine for the communication session, the primary NLP engine configured to process the one or more customer queries within the input data stream of the communication session;

based on a failure of the primary NLP engine such that the primary NLP engine is unable to process the one or more customer queries, automatically route the input data stream of the communication session to the standby NLP engine for the communication session, the standby NLP engine configured to process the one or more customer queries within the input data stream of the communication session; and generate one or more responses to the one or more customer queries within the input data stream of the communication session based at least in part on output of one of the primary NLP engine or the standby NLP engine for the communication session.

\* \* \* \* \*